United States Patent
Kelts et al.

(10) Patent No.: US 10,726,426 B2
(45) Date of Patent: Jul. 28, 2020

(54) BI-DIRECTIONAL TRUST INDICATOR

(71) Applicant: MorphoTrust USA, LLC, Billerica, MA (US)

(72) Inventors: A. David Kelts, Arlington, MA (US); Gustavo Candelas, Billerica, MA (US)

(73) Assignee: MorphoTrust USA, LLC, Billerica, MA (US)

( * ) Notice: Subject to any disclaimer, the term of this patent is extended or adjusted under 35 U.S.C. 154(b) by 194 days.

(21) Appl. No.: 15/694,346

(22) Filed: Sep. 1, 2017

(65) Prior Publication Data

US 2018/0060874 A1 Mar. 1, 2018

Related U.S. Application Data

(60) Provisional application No. 62/382,688, filed on Sep. 1, 2016.

(51) Int. Cl.
*G06Q 30/00* (2012.01)
*H04L 29/06* (2006.01)
*G06F 21/36* (2013.01)

(52) U.S. Cl.
CPC ......... *G06Q 30/018* (2013.01); *G06F 21/36* (2013.01); *H04L 63/123* (2013.01); *H04L 63/126* (2013.01); *G06F 2221/2119* (2013.01)

(58) Field of Classification Search
USPC ................................................ 382/100, 115
See application file for complete search history.

(56) References Cited

U.S. PATENT DOCUMENTS 8,090,351 B2 * 1/2012 Klein .................. G07C 13/00
455/411
8,910,258 B2 * 12/2014 Gonser ................ G06F 21/316
726/6

(Continued)

FOREIGN PATENT DOCUMENTS

EP 2732427 5/2014
WO 2016128569 8/2016

OTHER PUBLICATIONS

International Search Report and Written Opinion in International Application No. PCT/US2017/049924, dated Nov. 21, 2017, 13 pages.

(Continued)

*Primary Examiner* — Ishrat I Sherali
(74) *Attorney, Agent, or Firm* — Fish & Richardson P.C.

(57) ABSTRACT

A computer-implemented method is described. The method includes generating, for display on a computing device, an identification rendering viewable on a display of the device, the identification rendering including an authority indicator and a digital image of a person. The method further includes the device triggering an interactive effect associated with the identification rendering. The triggering occurs in response to the device receiving a trigger input and the trigger can be from any input or communications sensor of the computing device. The triggered interactive effect includes an authority indicator and a freshness indicator that enables an individual viewing the display to validate the identity of the person associated with the digital image. Validation can be based on at least one of a characteristic of the interactive effect and attributes of the person or the authority indicator.

30 Claims, 7 Drawing Sheets

(56) References Cited

U.S. PATENT DOCUMENTS

| | | | |
|---|---|---|---|
| 9,202,195 B1* | 12/2015 | Daniel | G06Q 10/0833 |
| 9,582,843 B2* | 2/2017 | Leonard | G06T 1/0042 |
| 9,721,147 B1* | 8/2017 | Kapczynski | G06Q 50/265 |
| 9,842,250 B2* | 12/2017 | MacDonald | G06K 9/00335 |
| 9,934,504 B2* | 4/2018 | Wang | G06Q 20/4014 |
| 10,019,774 B2* | 7/2018 | Leonard | G06T 1/0042 |
| 10,331,291 B1* | 6/2019 | Poder | G06F 21/34 |
| 2006/0115111 A1* | 6/2006 | Malone | H04N 1/32101 |
| | | | 382/100 |
| 2007/0258656 A1 | 11/2007 | Aarabi | |
| 2008/0089554 A1* | 4/2008 | Tabankin | G06T 1/0021 |
| | | | 382/100 |
| 2014/0049653 A1 | 2/2014 | Leonard et al. | |
| 2014/0152547 A1 | 6/2014 | Boss | |
| 2014/0270336 A1 | 9/2014 | Eckel et al. | |
| 2014/0333414 A1 | 11/2014 | Kursun | |
| 2015/0088778 A1 | 3/2015 | Tsao et al. | |
| 2016/0147492 A1 | 5/2016 | Fugate et al. | |
| 2016/0210621 A1 | 7/2016 | Kahn | |

OTHER PUBLICATIONS

European Extended Search Report in European Application No. 17847644, dated May 29, 2019, 9 pages.

* cited by examiner

BI-DIRECTIONAL TRUST INDICATOR

FIELD

The present specification is related generally to bi-directional trust indication, particularly during in-person transactions in which a user displays a digital identification for identity verification.

BACKGROUND

Physical identification cards such as driver licenses are commonly used for verifying the identity of an individual, providing access to restricted areas, authorizing an individual to purchase age-restricted content, or authorizing an individual to access networked computing resources. Such verifications often include both a check that the identification card is valid and that the card holder is the individual authorized to use it.

SUMMARY

Physical identification cards are provided by issuing authorities such as government agencies or companies to users during an issuance process. Such physical identification cards often include an image of the user that is used to verify the identity of the user, and in some instances, provide access or privileges to the user. When issuing authorities generate identification cards that have an image of the user, they can create identification cards with improved security features and tamper resistant materials that communicate accuracy, provenance and freshness to both the holder and verifier using the card. These improved security features can facilitate bidirectional trust during in-person interactions in which an individual uses a digital identification card (e.g., a mobile driver's license) to complete a transaction or access a restricted area.

One aspect of the subject matter described in this specification can be embodied in a computer-implemented method. The method includes generating, for display on a computing device, an identification rendering viewable on a display of the computing device, the identification rendering including indicators of authoritativeness/provenance, accuracy of the data, freshness/recentness of the data validation, and at least one of a digital image of the intended holder of the card or an attribute of that person.

The method further includes triggering, through one or more of the sensors with which the device is equipped, an interactive effect associated with the identification rendering, and perhaps at the location or direction of the trigger, in response to the computing device receiving that trigger input. In one aspect of the method, triggering the interactive effect enables an individual viewing the display to validate the digital identification rendering and the attributes of the person associated with the digital image, wherein validation is based, at least in part, on at least one of a characteristic of the interactive effect, the attribute of the person, the date of the most recent attribute validation, the validity of the attributes displayed, or the indicator of the authority that validated the attributes. These are collectively the trust indicators.

These and other implementations can each optionally include one or more of the following features. For example, the method further comprises, in response to triggering, indicating, by the computing device, a trust indicator associated with validation of the data displayed as part of the identification rendering, the provenance of the data validator, and the date of the most recent validation. In one aspect of the subject matter described in this specification, the trust indicator is provided, at least in part, by an authority associated with the authority indicator, and wherein the trust indicator includes at least one of a date or a time of a recent data validation.

In another aspect, the interactive effect includes altering the appearance of the identification rendering viewable on the display of the computing device, and wherein the display is a touch-screen display and receiving the trigger input includes a user touching the display of the computing device. In another aspect, the input trigger is the gyroscope, accelerometer, or geo-positioning sensors in the device detecting positioning of the visual rendering. In yet another aspect, the characteristic of the interactive effect includes at least one of a digital bubble effect, a digital ripple effect, a dimensional extrusion effect, a digital holographic effect, a digital "polasecure" reflective or kinegram effect, or a digital face positioning effect, any in response to sensor input.

In one aspect of the subject matter described in this specification, the method further comprises, sensing, by at least one sensor of the computing device, a user input to the computing device, wherein the user input causes an authentication feature associated with the identification rendering to be viewable on the display. In another aspect, at least one sensor includes an image acquisition sensor, an audio input sensor, a touch input sensor, a gesture recognition sensor, a device-positioning or orientation sensor, a nearby message receiver, or a location sensor. In yet another aspect, the authority indicator includes one or more of an official seal or provenance feature that indicates one of a state, a jurisdiction, a corporation, a credential service provider, an entity or an agency that authorized creation of the identification rendering. In yet another aspect, the method further comprises, regenerating the authority indicator for display by the computing device based, in part, on at least one of a predetermined schedule or the relative location of the computing device.

In some implementations, the method further includes, in response to triggering, indicating, by the computing device, a trust indicator associated with data displayed as part of the identification rendering.

In some implementations, the trust indicator is provided, at least in part, by an authority associated with the authority indicator, and wherein the freshness indicator includes at least one of a date or a time of a recent data validation update, wherein the authority indicator and the freshness indicator provide an indication of the accuracy of the identification rendering and the accuracy of data within the identification rendering.

In some implementations, wherein the authority indicator and the freshness indicator are each adjustable based on a pre-determined adjustment schedule to identify that a digital identification document that includes the identification rendering was issued from an official source and that the digital identification document includes information that was validated within a particular time period.

In some implementations, the trust indicator represents a regional or verifier-specific icon that is displayed, at the computing device, as part of the identification rendering to indicate that the identification rendering is located within a virtual boundary of a predetermined verifier region.

In some implementations, the verifier specific icon is displayed as part of the identification rendering along with an authority indicator of an entity that issued an identification document that includes the identification rendering, and wherein the authority indicator and the verifier-specific icon are displayed when the identification document is interactively authenticated within the virtual boundary of the predetermined verifier region.

In some implementations, the interactive effect includes altering an appearance of the identification rendering viewable at the display of the computing device, and the display is a touch-screen display and receiving the trigger input includes a user touching the display of the computing device, and wherein the interactive effect tracks to the touch location of the interaction to indicate liveliness.

In some implementations, the method further includes, sensing, by at least one sensor of the computing device, a user input to the computing device, wherein the user input causes an authentication feature associated with the identification rendering to be viewable at the display.

In some implementations, the at least one sensor includes an image acquisition sensor, an audio input sensor, a touch input sensor, a gesture recognition sensor, a positioning or acceleration sensor, a wireless communication detection sensor, or a location sensor, and wherein one or more of the sensors are configured to recognize a particular user input corresponding to a specific or personalized trigger.

In some implementations, the user input is for a Verifier personalized trigger and is personalized such that the user input is known to the Verifier only or could only be triggered by the Verifier, and wherein the Verifier personalized trigger is loaded at the computing device or is received at the computing device based on the computing device being located within a particular geo-location or based on the computing device receiving a secure nearby communication.

In some implementations, data representing the user input is communicated, via secure nearby communication or network messaging, to the computing device by a device of the Verifier, and wherein receipt, by the computing device, of the data representing the user input indicates that the computing device is configured to display visual rendering of an official mDL.

In some implementations, a personalized trigger of the Verifier challenges mDL application program of the computing device to authenticate a user of an mDL as the proper and intended mDL Holder through multi-factor authentication or based on the user input that corresponds to the personalized trigger of the user of the mDL.

In some implementations, the authority indicator includes one of an official seal or provenance feature that indicates one of a state, a jurisdiction, an entity or an agency that authorized creation of the identification rendering.

In some implementations, the method further includes: regenerating the authority indicator for display by the computing device based on at least one of: a predetermined schedule or the relative location of the computing device, wherein the computing device is configured to display the authority indicator and an indicator of a verifier entity.

Another aspect of the subject matter described in this specification can be embodied in a non-transitory computer storage device encoded with a computer program. The program may comprise instructions that when executed by one or more processing units cause the one or more processing units to perform operations including, generating, for display on a computing device, an identification rendering viewable on a display of the computing device, the identification rendering including indicators of authoritativeness/provenance, accuracy of the data, freshness/recentness of the data validation, and at least one of a digital image of the intended holder of the card or an attribute of that person. The method further includes triggering, by the computing device, an interactive effect associated with the identification rendering, wherein the triggering occurs in response to the computing device receiving a trigger input. In one aspect of the method, triggering the interactive effect enables an individual viewing the display to validate the identity of the person associated with the digital image, wherein validation is based, at least in part, on at least one of a characteristic of the interactive effect, the attribute of the person or the authority indicator.

Another aspect of this subject matter described in this specification is the implementation of a personalized trigger known only to either the mDL Holder or the mDL Verifier, that would manifest in some implementations as a personally chosen touch pattern or a specific audio phrase or a specific dimensional positioning of the phone or a combination. Another personalized trigger can include one or more characteristics that are inherent to the mDL holder such as iris, eye, or retinal features. In some implementations, an electronic device such as a smartphone can include one or more sensors such as iris/retinal scanners or iris/retinal recognitions sensors. These sensors can be configured to detect and/or track movement of the mDL holder's personalized iris features so as to initiate the personalized trigger. The execution of this personalized trigger pattern would in some implementations cause the interactive effect on the associated rendering or the appearance of one of the trust indicators or the execution of any user authentication method of the mDL App previously implemented in the application (e.g. biometric match of selfie to the stored biometric template thus verifying the mDL Holder identity).

Other implementations of this and other aspects include corresponding systems, apparatus, and computer programs, configured to perform the actions of the methods, encoded on computer storage devices. A system of one or more computers can be so configured by virtue of software, firmware, hardware, or a combination of them installed on the system that in operation cause the system to perform the actions. One or more computer programs can be so configured by virtue of having instructions that, when executed by data processing apparatus, cause the apparatus to perform the actions.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
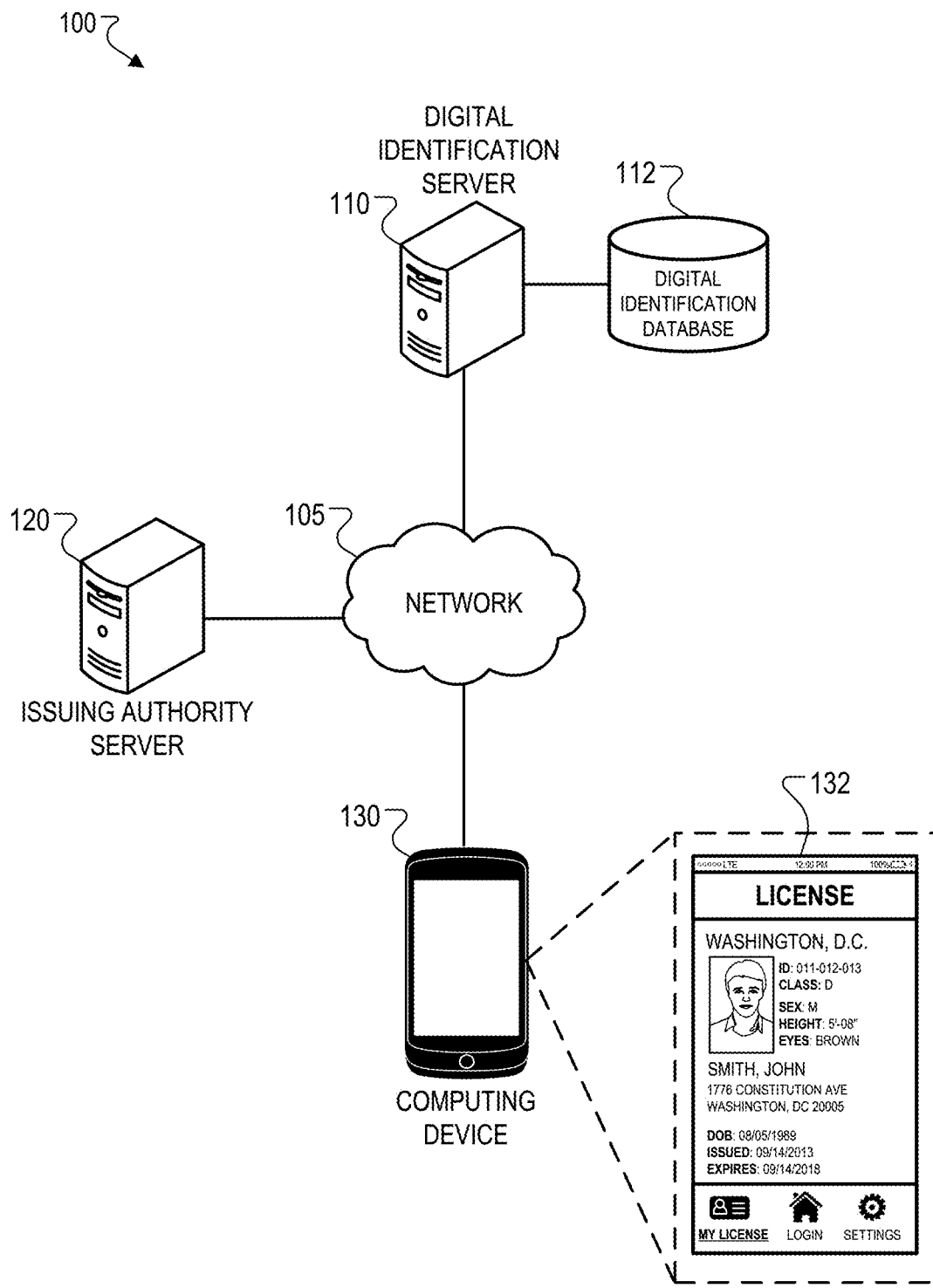
FIG. 1 illustrates an example architecture for a system for provisioning a digital identification (in one instance a mobile driver license—mDL) for a user.

This specification describes systems and methods for rendering a digital identification on a user device and triggering security features associated with the digital identification. The described subject matter includes digital identifications comprising visual indicators relating to three primary categories of trust or confidence—provenance, accuracy, and currency.

In the context of attribute confidence, provenance information generally includes data elements about a user or a digital identification that are associated with a particular entity that stands behind the digital identification. A recipient (i.e., relying party or verifier) may rely on the provenance information as being a legitimate indication of an authentic digital identification issued by an entity having the requisite authority.

Accuracy information generally includes data elements pertaining to a relying party's ability to determine if the identity attribute is correct and belongs to a specific entity such as the holder of the digital identification. Currency information generally pertains to the relying party's ability to determine the "freshness" of a given attribute. Freshness of a given attribute generally includes, for example, the date and time when the attribute was last updated or validated by the requisite authority. Freshness data may be used to derive the proximate age of the attribute that may be needed when determining if a transaction should be approved based on a Verifier's risk profile.

For enforcement of security features for digital identifications, the categories of attribute confidence provide an added trust factor during in-person visual transactions. This trust factor is created, in part, by use of one or more confidence measures associated with digital identification documents such as a mobile driver's license (mDL) or other electronic identity means rendered by visual representation on a computing device. In one example implementation, the mobile driver license (mDL) holder (i.e., the user) displays a rendering (visual representation) of their mDL (digital identification/ID) on the display screen of a mobile phone or computing device. The displayed rendering is then viewable by a verifier/recipient such as a store owner or law enforcement personnel.

The recipient receives information and confidence cues from the rendered digital identification. Either the recipient or the mDL holder may interact with the screen of the device. Screen interaction may occur when the user or the recipient swipes or taps specific areas of the rendered digital identification. Interactive security features or trust indicators may be embedded within the digital identification and may be triggered in response to the user or recipient providing a touch, swipe, or other tactile trigger input via a touch screen display of the computing device. These same trust indicators may also be dynamically retrieved from the authority.

In some implementations, the interactive security features or trust indicators can be triggered by any sensor input of the device. The touch or trigger inputs received by a computing device can be customized as personally known to either the Verifier or the mDL Holder ahead of time. For example, customized trigger inputs can include a known pattern swipe, known touch location, known spoken passphrase, nearby communication triggered by a device of the Verifier, or any other customizable input available to sensors of an example computing device.

When implemented, the systems and methods described herein can substantially mitigate the occurrence of, for example, the use of spoofed images by malicious or unauthorized individuals to impersonate legitimate authorized users or tampering of identity attributes by a malicious party. For example, spoofing images can be used to gain access to certain resources, steal sensitive or other data, or bypass access controls. In certain scenarios, spoofing may take the form of a still-photo and/or a video/replay in which the attacker uses a still image or replays a video of the legitimate digital identification using a digital device such as a mobile phone, tablet device or laptop computer while impersonation may be the use of the digital identification by other than the intended mDL Holder or on a device other than that to which the identification was issued.

Use of spoofed images can be substantially prevented by embedding interactive security features within a legitimate mDL displayed on a computing device, and triggering an occurrence of a security feature/attribute (e.g., an authority indicator) in response to a trigger input received by a sensor on the device. The detectable absence of interactive trust indicators embedded within spoofed digital ID documents can indicate that the ID document is not a legitimate document. Using provenance and freshness indicators alone or in response to these trigger inputs can convey the accuracy and legitimacy of the rendered digital identification and the identity attributes it displays.

FIG. 1 illustrates an example architecture for a system 100 for provisioning a digital identification 132 (hereinafter "digital ID 132") for a user. In one implementation, digital ID 132 is a mobile driver's license and may alternatively be referred to herein below as mDL 132. In general, system 100 may be used for various processes associated with provisioning a digital ID 132 or modifying/updating attributes or characteristics associated with digital ID 132. For example, system 100 may be used to initially enroll users into a digital identification program, provision a digital ID 132 to enrolled users, and refresh or update identity attributes or trust indicators associated with one or more enrolled users.

System 100 may include a digital identification server 110, an issuing authority server 120, and a user device 130 connected over a network 105. The digital identification server 110 may be configured to exchange communications with a digital identification database 112. User device 130 may be an example computing device such as a smartphone (e.g., an iPhone, Samsung Galaxy, or an Android device), a tablet device, a laptop computer, a wearable device (e.g., smartwatch), or any other electronic computing device capable of rendering a digital image of a user. In addition, user device 130 may display a digital identification 132 on a user interface rendered via the device screen/display. Although the digital ID 132 is depicted as a digital driver's license in FIG. 1, digital ID 132 can be a digital rendering of any physical identification card issued to a user from various types of identification issuing authorities (e.g., a government agency or a company).

System 100 can periodically assign and/or update a trust indicator associated with digital ID 132. The trust indicator may also be referred to herein as a provenance indicator and can be assigned to a particular user. In some instances, the trust indicator is assigned to a user for predefined time period or is periodically updated based on a predefined or dynamic refresh/update rate. The trust indicator included with a rendering of digital ID 132 can correspond to a set of interactive effects that occur in response to a trigger input and/or a user input provided to user device 130.

System 100 can be configured to control, modify, or cause certain trust indicators associated with digital ID 132 to be displayed at user device 130. For example, a security attribute received by a user device 130 from digital identification server 110 may indicate that when digital ID 132 is displayed via user device 130 on a Monday, digital ID 132 will include a first provenance/authority indicator. Likewise, when digital ID 132 is displayed via user device 130 on a Tuesday, digital ID 132 will include a second provenance/authority indicator that is different than the first authority indicator.

As described in more detail below, provenance indicators can correspond to a particular seal, distinguishing mark or other related distinct identifier for a particular entity or issuing authority that authorized creation of digital ID 132 (See FIG. 2). In some implementations, provenance/authority indicators can include a particular digital image, a particular verification phrase, a checksum of user information calculated with a particular checksum algorithm, an authority indicator for a particular entity or jurisdiction, or attribute refresh information provided by the entity or jurisdiction.

Figure 2:
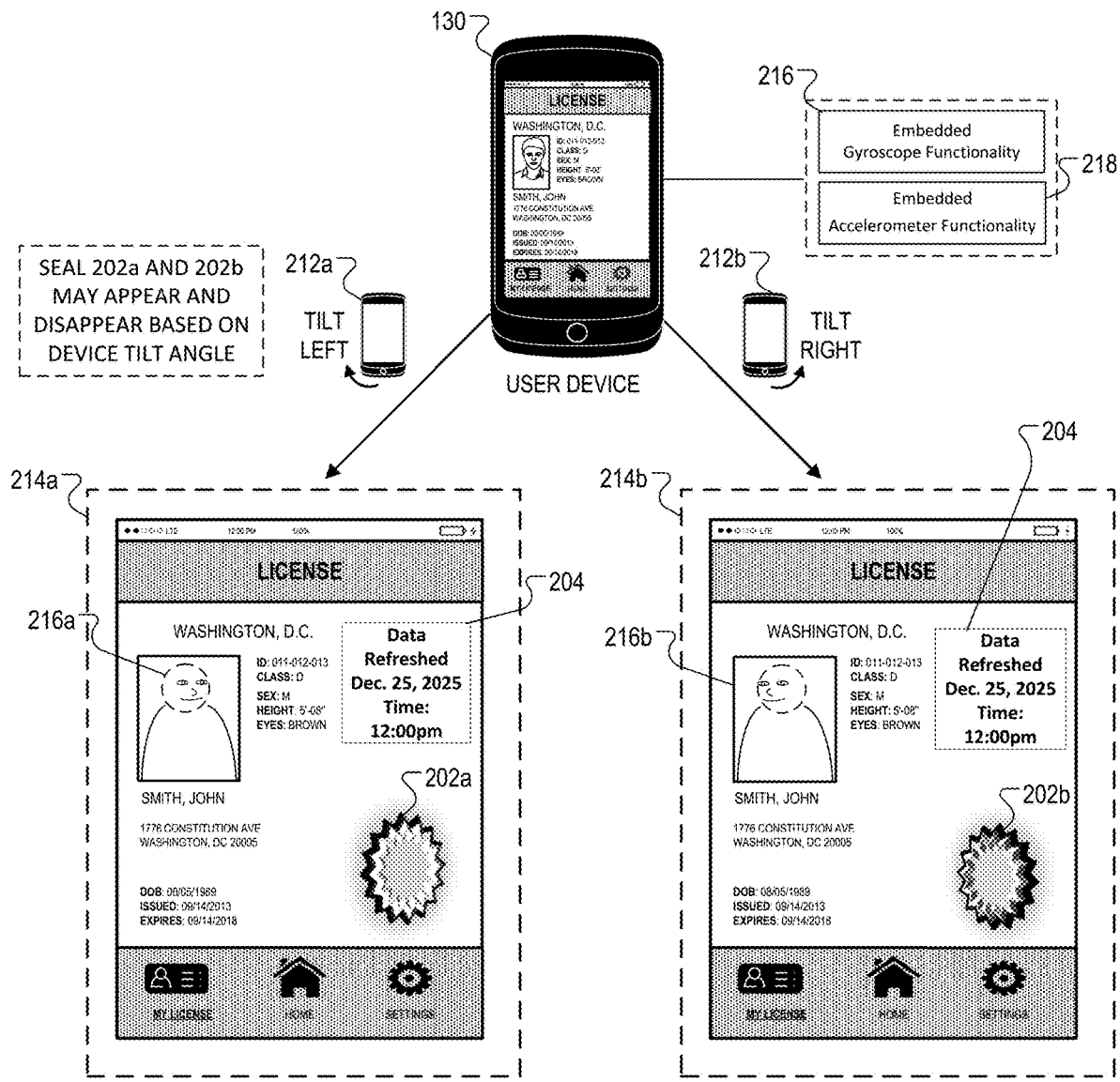
FIG. 2 illustrates positional interactive security features and trust indicators associated with the digital identification provisioned by the system of FIG. 1.

FIG. 2 illustrates trust indicators associated with an example digital ID 132 provisioned by system 100 of FIG. 1. As shown in FIG. 2, and as discussed briefly above, digital ID 132 can include at least one provenance indicator 202. As described herein, the provenance (or authority) indicators may be provisioned by the digital identification server 110 and configured for rendering, in digital or electronic form, at a screen or display of user device 130. During in-person transactions in which user verification is required to complete the transaction, provenance indicator 202a/b may be relied on by a recipient (i.e., a relying party or a verifier) as a trusted indication that digital ID 132 is a "valid" or "authentic" digital identification for a real and currently valid digital ID holder.

Provenance indicator 202a/b can represent a digital authority seal or distinct indicator that identifies a particular jurisdiction or entity. In some implementations, authority indicator 202a/b can include holographic properties that are analogous to state seals integrated within physical driver's licenses or other identification documents. Authority indicator 202a/b can be rendered in digital or electronic form (e.g., dot matrix digital hologram) in a sequenced or static image with digital ID 132, e.g., as an overlay to digital ID 132. When rendered with digital ID 132, authority indicator 202a/b can include certain interactive effects that appear more pronounced or exaggerated based on a particular viewing plane or tilt angle of user device 130.

In some implementations, authority indicator 202a/b indicates validity, officiality, authenticity, or legitimacy of a digital ID 132. For example, validity or officiality is indicated when authority indicator 202a/b has a shape or outline that, for example, is similar to a state seal of the jurisdiction that issued the digital ID, a state bird of the jurisdiction that issued the digital ID, a logo or trademark of a particular venue in which the ID is being used, or any other suitable digital rendering appropriate for a particular transaction that requires identity verification.

User device 130 may also include software applications or program code that are executable by a processor to cause a digital rendering of authority indicator 202a/b to be adjusted in response to tilt motions of user device 130. For example, a rendering configuration of the program code may specify which aspects of authority indicator 202a/b (e.g., edge features, indicator shape, indicator brightness) to exaggerate of modify responsive to a tilt magnitude detected by a gyroscope or accelerometer of user device 130 (features 216 and 218, respectively). In such implementations, authority indicator 202a/b is periodically updated in response to tilt motions (e.g., left, right, up, down) of user device 130. The tilt motions cause modified digital renderings, such as authority indicator 202a and 202b. A resulting effect of modified renderings of authority indicator 202a/b in a sequence can be similar to effects caused by reflected light or holograms embedded in physical identification cards.

In one implementation, a seal or mark displayed via authority indicator 202a/b can be modified, altered or entirely changed based on a predetermined or random time schedule. Periodic altering or changing of a mark or seal associated with authority indicator 202a/b can substantially reduce (or prevent) potential spoofing of an interactive security feature. As such, a proof of provenance or authority can be rotated or randomly assigned based on a known or dynamic refresh/update frequency, or based on a particular geographic location of user device 130.

In alternative implementations, authority indicator 202a/b can be customized for a particular recipient. For example, if a holder of a digital ID document engages in a potential sales transaction at a liquor store, user device 130 may sense or detect the current sales venue based on location data (e.g., GPS data). Authority indicator 202a/b can then display a particular state seal based on the location of the sales venue (or user device 130) and fade to a known logo of the seller or liquor store. Such interactive security features can enhance the integrity of identity verification process that occurs during in-person sales transaction of age-restricted content.

As indicated at FIG. 2, in some implementations, sensing or detecting by user device 130 can be accomplished by one or more motion/movement sensors of user device 130. For example, the mDL holder (i.e., the user) displays a rendering or visual representation (214a or 214b) of their mobile driver license on the display screen of user device 130. The displayed rendering includes provenance indicator 202a or 202b (depending on device tilt angle) and is viewable by a recipient, such as a store owner or law enforcement personnel.

As depicted at FIG. 2, authority indicator 202a/b may be adjusted based on tilt motions. For instance, as shown, digital renderings 214a and 214b of digital ID 132 may be shown in response to tilt motions 212a and 212b, respectively. Thus, either the recipient or the mDL holder may interact with user device 130 by tilting or rotating user device 130 to trigger, modify, or exaggerate certain features or characteristics of authority indicator 202. In addition, as described in more detail below (see description of FIG. 4), a series of two-dimensional (2D) portraits 404 composited into a 3D rotating portrait 406 can be displayed selectively in response to the tilt motions 212a and 212b to give the effect that the portrait image always looks in the same direction or that the portrait eyes track the location of the mDL Verifier (see features 216a and 216b) relative to the mDL rendered at a display screen. A digital portrait image that appears to always looks in a particular direction or that includes portrait eyes which appear to track the location of the mDL verifier can correspond to an effect of being watched or of looking away from the perspective of the verifier.

In addition to authority indicator 202a/b, digital ID 132 may also include a data currency or data freshness indicator 204. As shown, data freshness indicator 204 indicates, to a party viewing digital ID 132 that the user attributes displayed are in fact current and "fresh." In some implementations, freshness indicator 204 includes the date and time of the most recent data update. This ensures, to the recipient, that the user attribute information displayed via digital ID 132 is recent and up-to-date. Thus, freshness indicator 204 may be included with digital ID 132 to provide the recipient viewing the ID with an understanding of how current the attribute value is.

Specifically, this enables the recipient or relying party to determine if the date of last refresh is sufficient for a specific attribute or use. A freshness update frequency (not shown) may also be included with a displayed freshness indicator 204 to enable the recipient to understand the rate at which attribute data is updated or refreshed. Likewise, a digital ID expiration date may also be included with, or alongside, a displayed freshness indicator 204 so the recipient knows the date at which an attribute's value is no longer valid for its defined use.

As described herein, user attribute information may refer to, or include, user information displayed with digital ID 132. Such user information can include personally identifiable information associated with the user, such as driver license numbers, place of residence, age, gender, and/or other related demographic or identifying information. Access to the user attribute information of digital ID 132 can be restricted by digital identification server 110 by using unique authorization procedures (e.g., requiring user access codes) to access the sensitive information on the client device 130.

Authority indicator 202 and currency indicator 204 may be provided by, for example, a digital identification server 110 that is monitored and operated by an organization or institution authorized by an identification issuing authority to provide digital ID 132 to a user or customer. In some instances, the organization operating the digital identification server 110 can be an entity designated by the identification issuing authority to access identification information for multiple users that have been issued corresponding physical ID cards. In other instances, an entity operating the digital identification server 110 may be the identification issuing authority (e.g., a government institution) that issues individual physical or digital identification cards to multiple users.

In some implementations, a recipient may utilize a verification application program installed on, and accessible from, the recipient's own device. The verification program can be used to verify the authenticity of an mDL/digital ID 132 being displayed at user device 130. For example, verification occurs based on use and/or detection of digital watermarks associated with digital ID 132.

In some implementations, during the verification process there are two devices, user device 130 and the recipient's device. The recipient interacts with a verification application that is launched from the recipient's own device, and can trigger the same interactivity and attribute confidence indicators (e.g., indicators 202 and 204) to appear on user device 130. When the recipient provides a touch or tactile input via the screen of the recipient's device, this causes corresponding interactive visual effects to occur at the screen of user device 130.

In one example, user device 130 and the recipient's device can be coupled via a secure data communications link. The communications channel/link can be a Bluetooth or Wifi-direct communication link, or a related near field communication (NFC) channel. The encryption features and overall security of the channel/communications link between user device 130 and the recipient's device provides an additional trust factor in relation to the interactivity. Thus, a user that has rendered an mDL 132 at a screen of user device 130 can transmit image data, for the rendered mDL 132, to the recipient's device for rendering mDL 132 at the display screen of the recipient's device (or another verification device). In some implementations, transmitting the image data to the recipient's device allows the recipient to view the interactive visual effect and the authority indicator seal of confidence.

Figure 3:
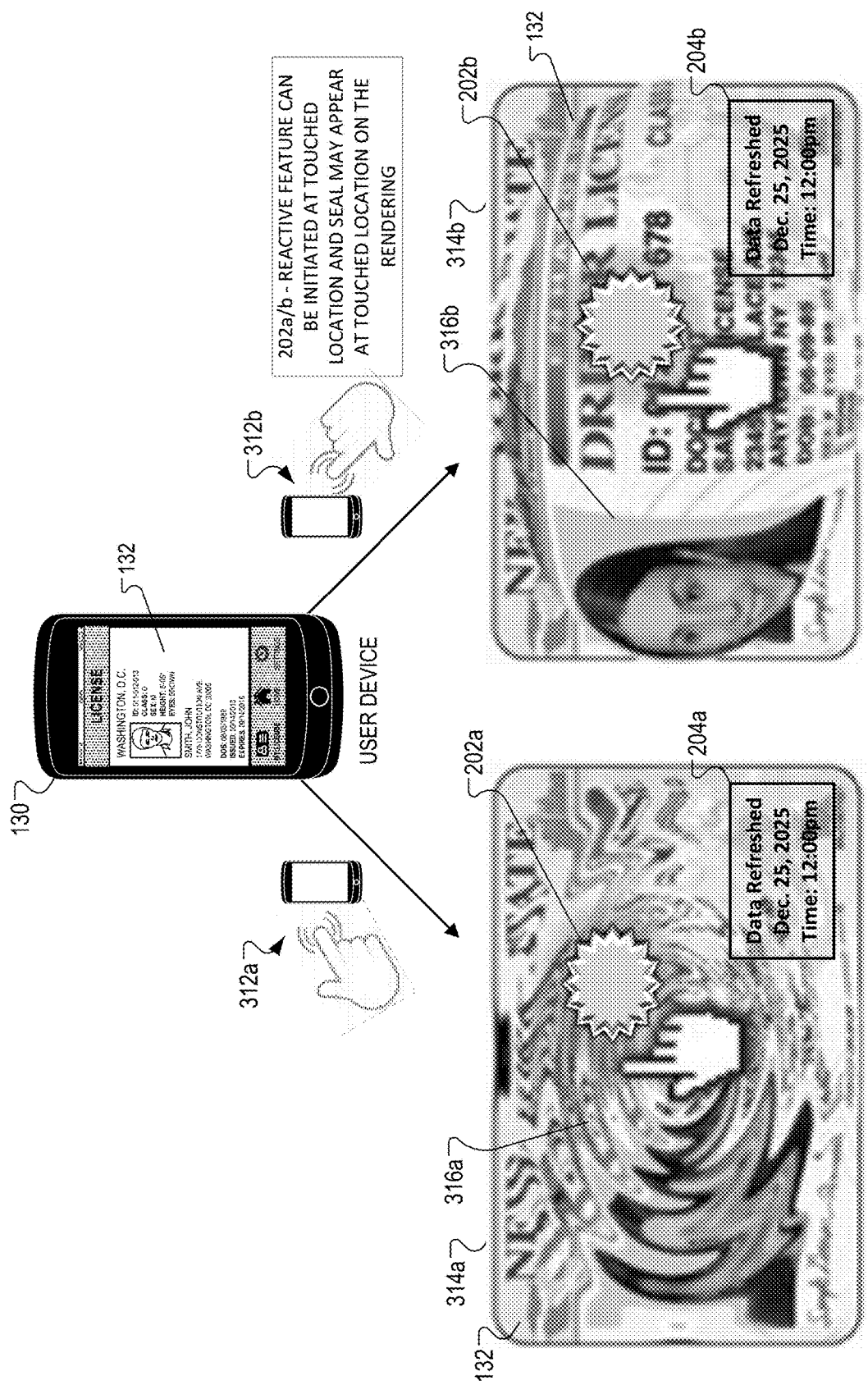
FIG. 3 illustrates additional touch-triggered security features associated with the digital identification provisioned by the system of FIG. 1.

FIG. 3 illustrates additional security features associated with digital ID 132 provisioned by system 100 of FIG. 1. In various implementations, user device 130 can be configured to sense or detect input data or information from the environment, the recipient, the mDL holder, or combinations of each. Sensing or detecting by user device 130 can be accomplished using digital camera functionality, location/global positioning signal (GPS) functionality, touch screen display functionality, audio sensors of user device 130, or any combination of these sensing/detecting options. Use of the input sensors or detection means of user device 130 aids in creating interactive security features based on triggered effects, information overlays, data feedback specific to a particular location of the touch input, the interpretation of speech audio input, or facial/gesture recognition received by the device camera.

As shown generally in FIG. 3, user device 130 can render a digital ID corresponding to digital ID representation 314a and/or 314b. Authority indicator 202a/b and freshness indicator 204 may also be included in representation 314a and/or 314b. In some implementations, and as noted above, interactive security features/effects or confidence measures can be included with, displayed with, embedded within, integral to, or otherwise associated with digital ID 132. In particular, such interactive effects can be triggered in response to a user or recipient tilting or moving user device 130 or providing, for example, a touch, swipe, or other tactile input via a touch screen display of computing/user device 130. As such, a recipient viewing the display screen of user device 130 receives attribute authentication/verification indicators and confidence cues from the rendered digital ID (e.g., representation 314a, 314b).

A variety of interactive security effects can be included with digital ID 132. In particular, a variety of interactive security effects can be instantiated and subsequently altered by a user or recipient in response to an example input control signal (i.e., trigger input) received by, or provided to, a particular sensor or detection means of user device 130. In some implementations, triggering an interactive security effect can include altering the appearance of a digital ID viewable at the display of user device 130. In one example, the display can be a touch-screen display and providing the input control signal to a sensor of user device 130 can include a user (or recipient) touching/tapping the display of the computing device.

For instance, as shown in FIG. 3, interactive security effects 316a and 316b of digital renderings 314a and/or 314b can be shown in response to a tap, pinch or swipe motion 312a and 312b. More specifically, either the recipient or the mDL holder (user) can interact with user device 130 by tapping, pinching, or swiping the screen of user device 130 to trigger, modify, alter, or exaggerate certain characteristics or attributes of digital ID 132. In some implementations, characteristics of the interactive effect include a digital bubble effect, a digital ripple effect, a dimensional extrusion effect, a digital holographic effect, a digital polasecure effect, a digital face rotation effect, or combinations of each (See FIG. 4, feature 408). Hence, tapping the screen of user device 130 can trigger an interactive feature such as a ripple effect 316a. Likewise, tapping the screen of user device 130 can trigger an interactive feature such as a bubble effect 316b.

Digital ripple effect 316a and digital bubble effect 316b can be generated by standard program code configured to produce a variety of computing device digital graphics functions. Additionally, polasecure effects can include digital ID optical variations that appear and disappear relative to the angle of viewing for user device 130. In some implementations, a seal/hologram can appear or disappear at predetermined positional settings (e.g. 45, 60, 75, 90 degrees from a vertical or horizontal axes of user device 130).

Related digital polasecure effects can also include optical effects or features which cause a digital image or digital text to shift from one color to another color based on a viewing angle of user device 130. Similarly, other features associated with digitally varying the appearance, characteristics, or features of a digital ID 132 can include, for example, incorporation (into the digital rendering) of visible and/or indistinct authority patterns or provenance logos, and/or incorporation of multi-color provenance images that are visible only from a particular user device viewing angle.

In some implementations, regarding the triggered interactive effects, if a recipient touches or otherwise provides a tactile input (e.g., via a stylus pen) to the screen of user device 130 at any location of the visual representation of mDL 132, the mDL 132 will react to the location of that touch. In other implementations, digital ID 132 (i.e., mDL 132) reacts with a location-centered visual indicator to create a feeling of "interactivity" with a display of user device 130 to provide a quality of liveness to the user or recipient. In various implementations, such liveness interactions or indications can include bubble effect 316a and ripple effect 316b.

In some implementations, digital ID 132 can include a variety of interactive security effects related to the polasecure effects discussed above. For example, digital ID 132 can include an effect that occurs responsive to when user device 130 approaches a particular level in any of the three dimensions. When leveling occurs, the triggered response can include a digital outline of a certain state or jurisdiction appearing in a specific color (e.g., gold) with, or as an overlay to, a digital image rendering.

For example, digital ID 132 can include a non-metalized kinegram effect that is also responsive to when user device 130 approaches a level in any of the three dimensions. When leveling occurs, the triggered response can include a first digital pattern appearing at the device screen, however slight rotations of user device 130 will cause a second digital pattern (that differs from the first) to appear in a certain color (e.g., gold). In one implementation, the rendered color can depend on the user's chosen angle or direction of rotation, thereby creating a holographic affect. Further, the user can slightly rotate user device 130 through three dimensions to cause a pattern sequence to appear in combination with digital ID 132 rendered at the display screen of user device 130.

In yet another example, a user face or portrait image associated with digital ID 132 can demonstrate features that are analogous to the well-known "Harry Potter Head." Thus, when rendered at the display screen of user device 130, the user face can appear to continually face straight forward from the device when the device is held idle. However, slight rotations in the horizontal plane can cause the user face to turn in a direction opposite the angle of rotation, thereby causing the well-known "Abraham Lincoln" effect corresponding to an appearance that the user face is continually watching an individual viewing the screen of user device 130.

Figure 4:
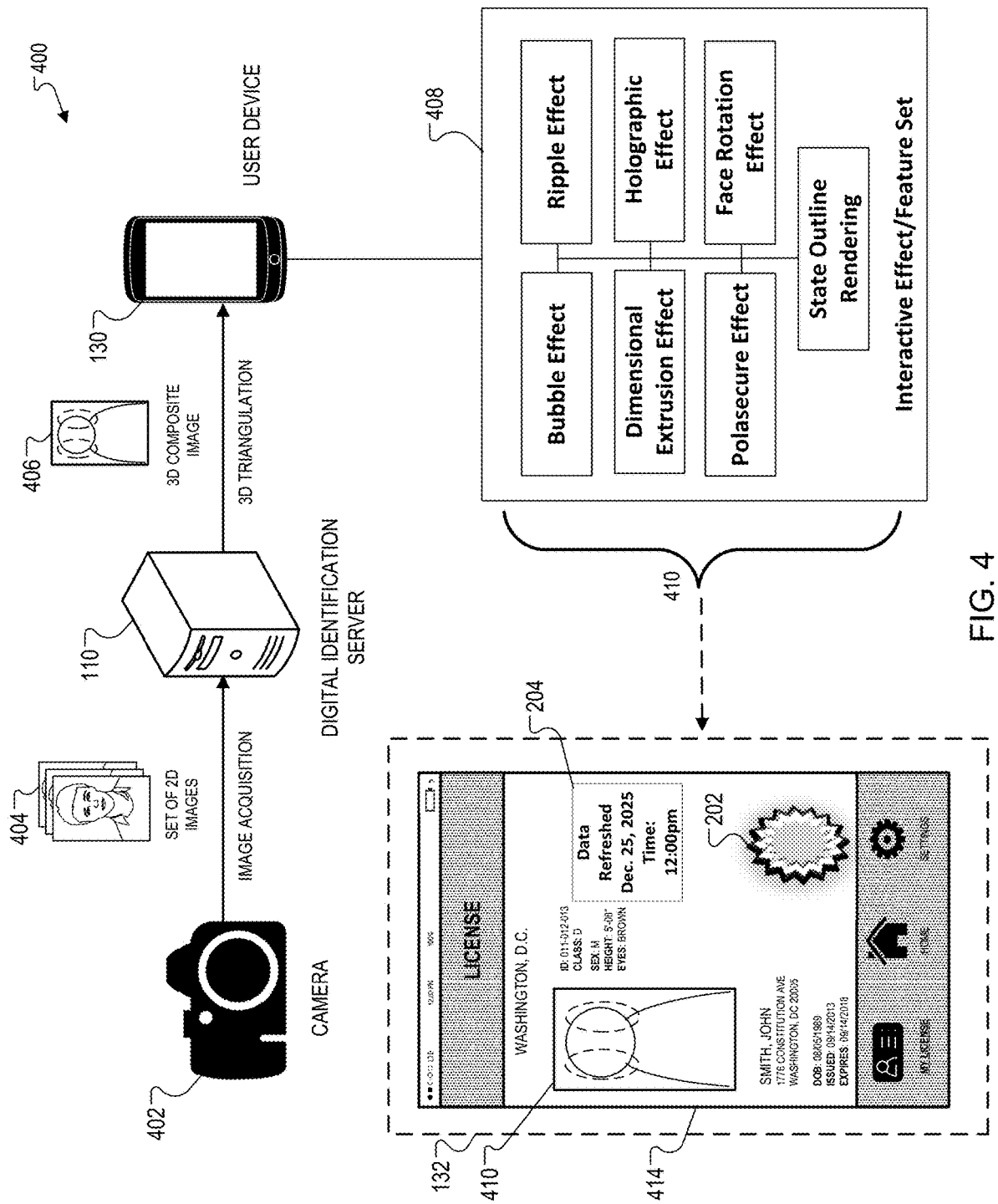
FIG. 4 illustrates an example architecture for a system for generating a three dimensional composite image within a digital identification that includes one or more security features and then a subset of interactive security features that would operate the trust indicators shown.

FIG. 4 illustrates an example architecture for a system 400 for generating a three dimensional composite image within a digital ID 132 that includes one or more security features or attributes discussed above. As depicted, system 400 generally includes a camera 402 for capturing a set of two dimensional images 404 of a user and for transmitting the set of two dimensional images 404 to a digital identification server 230. The digital identification server 110 can generate a 3D composite image 406 using, for example, a three dimensional triangulation procedure, and transmitting image data for the three dimensional composite image 406 to user device 130. As discussed above, in various implementations, user device 130 can be configured to sense or detect user or trigger input. Additionally, the user/trigger input received by sensors or detection means of user device 130 can create interactive security features based on triggered effects that are viewable at a display of user device 130.

In one implementation, sensing or detecting by user device 130 is accomplished by tilt motion/movement and/or touch screen display functionality integral to user device 130. Referring again to FIG. 4, the rendered three dimensional composite image 410 of digital ID 132 can be adjusted based on tilt angle of user device 130. For instance, digital rendering 414 included with digital ID 132 can be rendered for display at user device 130 in response to tilt motions 212a and 212b.

For example, user device 130 can also include executable software applications or program code for adjusting the display of three dimensional image 410 in response to tilt motions of user device 130 as well as in response to taps, swipes or pinches to the screen of device 130. In particular, a rendering configuration of the program code can specify directions to rotate the rendering of the user face (e.g., left, right, up, down) within three dimensional composite image 410 responsive to a tilt magnitude detected by a gyroscope/accelerometer of the user device 130 (or taps/swipes/pinches based on touch screen functions). In such implementations, three dimensional composite image 410 is periodically updated based on successive tilt motions or successive tactile inputs provided to the user device 130.

As shown generally in FIG. 4, user device 130 can render a digital ID 132 that includes digital ID representation 414. Authority indicator 202a/202b and freshness indicator 204 can also be included in representation 414. In some implementations, and as noted above, interactive security features/effects or confidence measures can be included with, displayed with, embedded within, integral to, or otherwise associated with digital ID 132. As described above, the characteristic of the interactive effect can include a digital bubble effect, a digital ripple effect, a dimensional extrusion effect, a digital holographic effect, a digital polasecure effect, a digital face rotation effect (plurality of features 408), or combinations of each. Hence, interactive effect/feature set 410 can include a plurality of features 408 that may be used in combination with the three dimensional composite image 410 of digital ID representation 414.

In some implementations, instead of being a three dimensional reconstruction of the set of two dimensional images 404, the three dimensional composite image 406 can alternatively include a library of individual digital images that include different rotational views of a user's face. For example, a rendering configuration can specify particular images from the library of individual images to be displayed with the digital ID 132 in response to specified tilt angles of user device 130. In some implementations, instead of updating the rendering of the three dimensional composite image 406, user device 130 can instead select a particular two dimensional image to display with digital ID 132.

Figure 5:
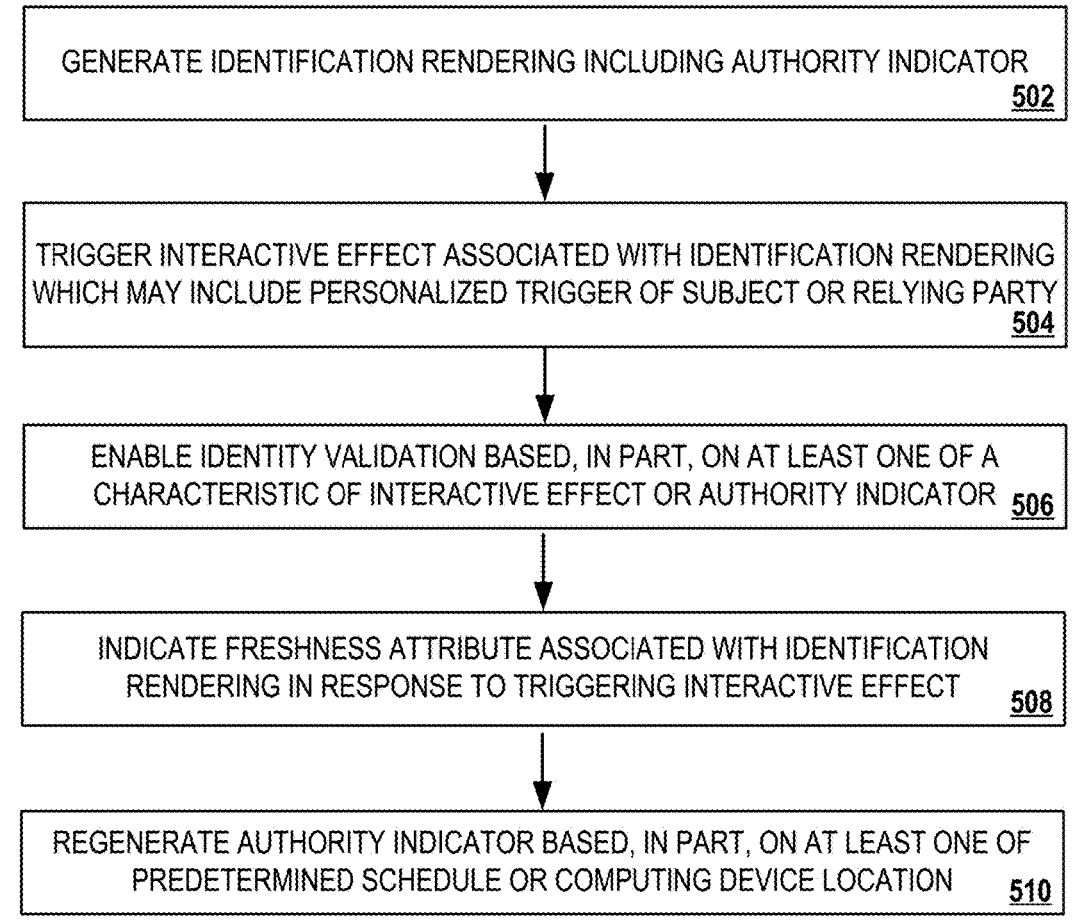
FIG. 5 illustrates a flowchart of an example process associated with rendering a digital identification on a user device and triggering one or more security features associated with the digital identification.

FIG. 5 illustrates a flowchart of an example process associated with rendering a digital identification at user device 130 and triggering one or more interactive security features associated with digital ID 132. At block 502, process 500 includes generating, for display on user device 130, a digital identification rendering (i.e., digital ID 132) that is viewable at a display of user device 130. In some implementations, the digital ID includes at least one authority indicator 202 and at least a digital image of a person, an attribute of the person, or both. As described above, the attribute can refer to, or include, user information displayed with a digital ID 132. In some implementations, the attribute information can include a user's personally identifiable information, such as a social security number, a driver license number, place of residence, age, gender, and/or other related demographic or personal information.

At block 504, process 500 includes triggering, by user device 130, an interactive security effect associated with the identification rendering. In some implementations, triggering occurs in response to user device 130 receiving a trigger input. The trigger input can be received by user device 130 based on a user (ID holder) or recipient (relying party) providing input to user device 130. In some implementations, input is received by user device 130 from signal data associated with the environment, from the recipient, from the mDL holder, or combinations of each.

In some implementations, user device 130 receives the trigger input based on the device sensing or detecting certain input signals. For example, user device 130 can use face/gesture recognition functionality through the device's built-in digital camera to sense or detect certain input signals or certain user input at the device. Likewise, trigger inputs can be provided based on user device 130 receiving a particular location/global positioning signal, receiving a touch screen display signal, receiving one or more audio input signals, or any combination of these sensing/detecting options.

At block 506 of process 500, user identity validation is enabled based on the triggered interactive effect. In various implementations, a triggered interactive effect, such as rendering authority indicator 202 or freshness indicator 204, enables an individual viewing the display of user device 130 to validate the identity of the person associated with the digital image. For example, validation can be based, at least in part, on a bubble or ripple characteristic of the interactive effect, freshness information relating to an attribute of the person, a particular authority indicator 202 that's rendered with the digital ID 132, or combinations of each. As such, at block 508, in response to triggering the interactive effect, user device 130 can cause a trust indicator (i.e., freshness indicator 204) associated with user attribute data to be displayed with, as part of, the digital identification render at user device 130.

At block 510, process 500 includes regenerating authority indicator 202a/b for display by user device 130 based, in part, on a predetermined schedule or the relative location of the user device, or both. For example, authority indicator 202a/b can change from a first provenance feature to a second provenance feature that is different than the first provenance feature. In particular, authority indicator 202a/b can change from a first provenance feature to a second provenance feature based on an hourly update rate, a daily update rate, a weekly update rate, a monthly update rate, or any other predetermined or dynamic indicator regeneration schedule.

Further, in another example, authority indicator 202a/b can include a first provenance feature that is displayed when a user (holding user device 130) enters a first venue to engage in a first transaction. However, authority indicator 202a/b can change from the first feature to the second provenance feature when a user enters a second venue to engage in a second transaction, the second venue being at a different physical location from the first venue.

In general, hostile or malicious individuals or entities desiring access to sensitive information may seek to engage in unauthorized and fraudulent use of a holder's digital ID. Such unauthorized use can be analogous to misuse associated with physical ID cards. Use of provenance indicator 202a/b and freshness indicator 204 (either alone or in combination) provide a reliable deterrence to digital ID misuse based on distinct indications of the legitimacy, authenticity, and currency of digital ID 132. Stated simply, if provenance indicator 202a/b or freshness indicator 204 (or both) is displayed in conjunction with digital ID 132, then an individual or entity attempting to misuse a user's digital credentials will be denied access to a particular location or can be prohibited from purchasing age restricted merchandise. Thus, when rendered with digital ID 132, the described interactive security features aids in preventing fraudulent or unauthorized use of digital ID 132.

Figure 6:
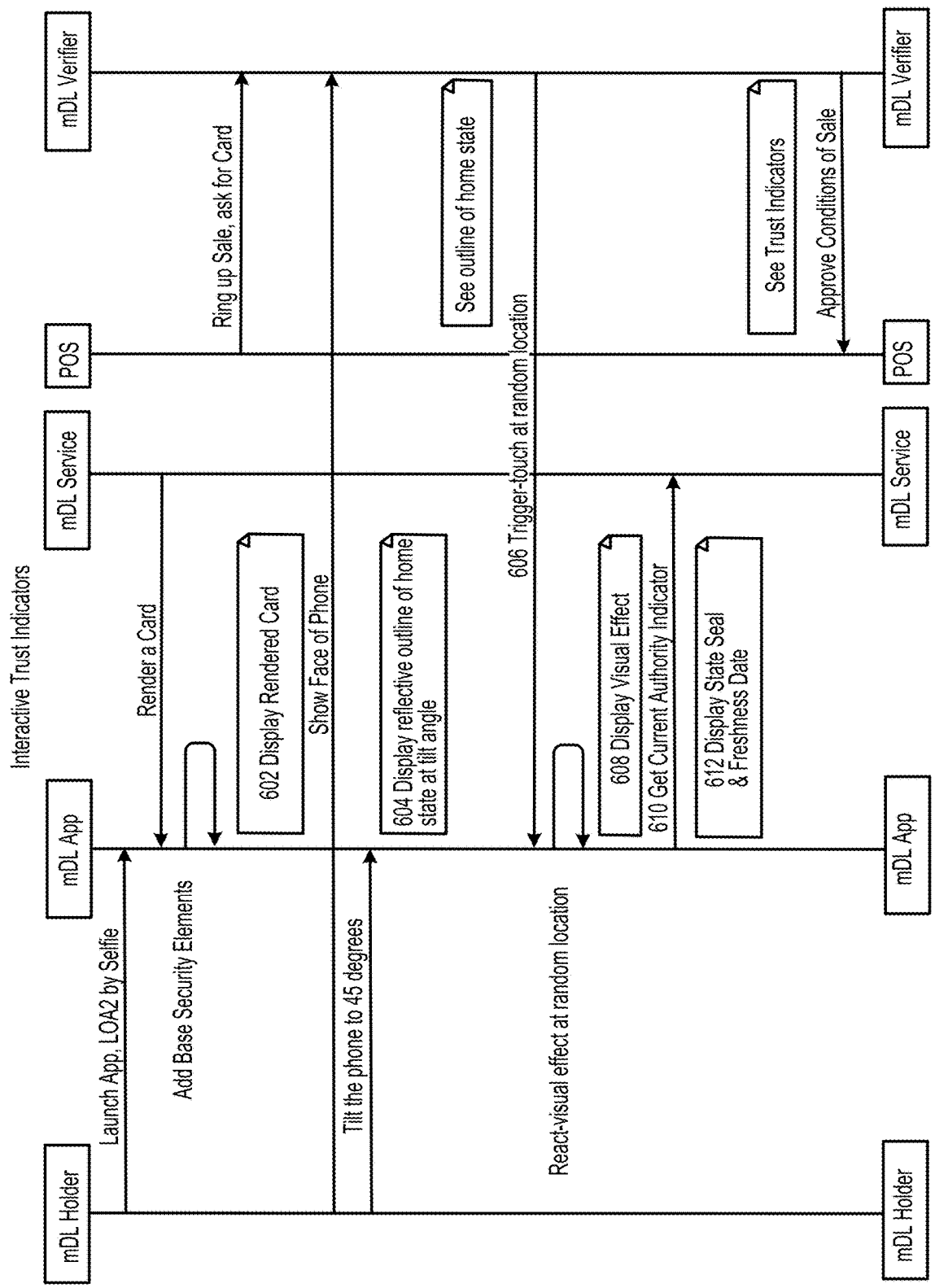
FIG. 6 illustrates a sequence diagram for an in-person interaction in which the Holder of the digital identification presents it to a Verifier, either of which can perform some action to trigger an interactive security feature and the display of trust indicators.

FIG. 6 illustrates a sequence diagram for an in-person interaction where a holder of the digital ID 132 presents the digital ID to a verifier. During this in-person interaction (e.g., for completing a sales transaction), either the holder or the verifier can perform an action to trigger an interactive security feature and to trigger a digital rendering of trust indicators at a display of user device 130.

As shown in FIG. 6, the in-person interaction can include an mDL holder using an application program of user device 130 to display a digital rendering of digital ID 132 (602). For example, the application program can be launched and security elements of the program can require the holder to authenticate to the application (e.g., using a login ID and password, a secure token, or fingerprint scan).

Security elements of the application program can be based on a Level of Assurance 2 (LoA2) degree of confidence in the asserted identity of the holder. Hence, successful authentication is dependent upon the user/mDL holder proving, through a secure authentication protocol, that they have control of an agreed identity credential, that they are in possession of user device 130, that they have access to user device 130, or combinations of each. User authentication to the application program causes an application server (e.g., digital ID server 110) to transmit data (e.g., image data) for rendering digital ID 132 at user device 130 (602). When digital ID 132 is rendered at user device 130, the holder of the ID credentials can show or display digital ID 132 to a recipient or relying party during the in-person interaction or to complete a particular transaction.

Upon viewing digital ID 132 a recipient, relying party, or verifier may rely on provenance information of the ID as being a legitimate indication of an authentic digital identification document issued by an entity having the requisite issuing authority. In some implementations, during the in-person interaction, digital ID 132 can include an authority indicator 202*a/b* that has interactive effects that appear more pronounced or exaggerated based on a particular viewing plane or tilt angle of user device 130. Hence, the holder can tilt user device 130 (e.g., at 45-degree angle) to display an interactive authority indicator, such as a reflective outline of a state or jurisdiction that issued the digital ID 132 (604).

The verifier can assess or inspect the authority indicator 202*a/b* (e.g., the reflective outline of the holder's state of residence) included with the rendering of the digital ID 132 at user device 130. In some implementations, user device 130 receives input from the verifier to trigger one or more visual interactive effects of authority indicator 202*a/b* (606). The input can be received in response to touch/tactile input (e.g., touching a screen of the device) at a random or arbitrary location of the digital ID 132. An interactive visual effect of authority indicator 202*a/b* is displayed at user device 130 in response to the verifier provide input to user device 130 to trigger the effect (608).

An mDL application program executing at user device 130 can transmit a request to a digital ID server 110 to obtain a current (fresh) or an updated authority indicator 202*a/b* (610). Digital ID server 110 can respond to the request by transmitting identification data and provenance data, such as text data, image data, or both. User device 130 receives the identification and provenance data and causes digital ID 132 to be displayed with an updated authority indicator 202*a/b* (e.g., a digital State Seal) and freshness indicator 204 that includes a freshness date (612). A verifier can assess or inspect the updated authority indicator 202*a/b* and freshness date (collectively "trust indicators") of the digital ID 132 and approve conditions for completing the transaction based on the trust indicators.

Figure 7:
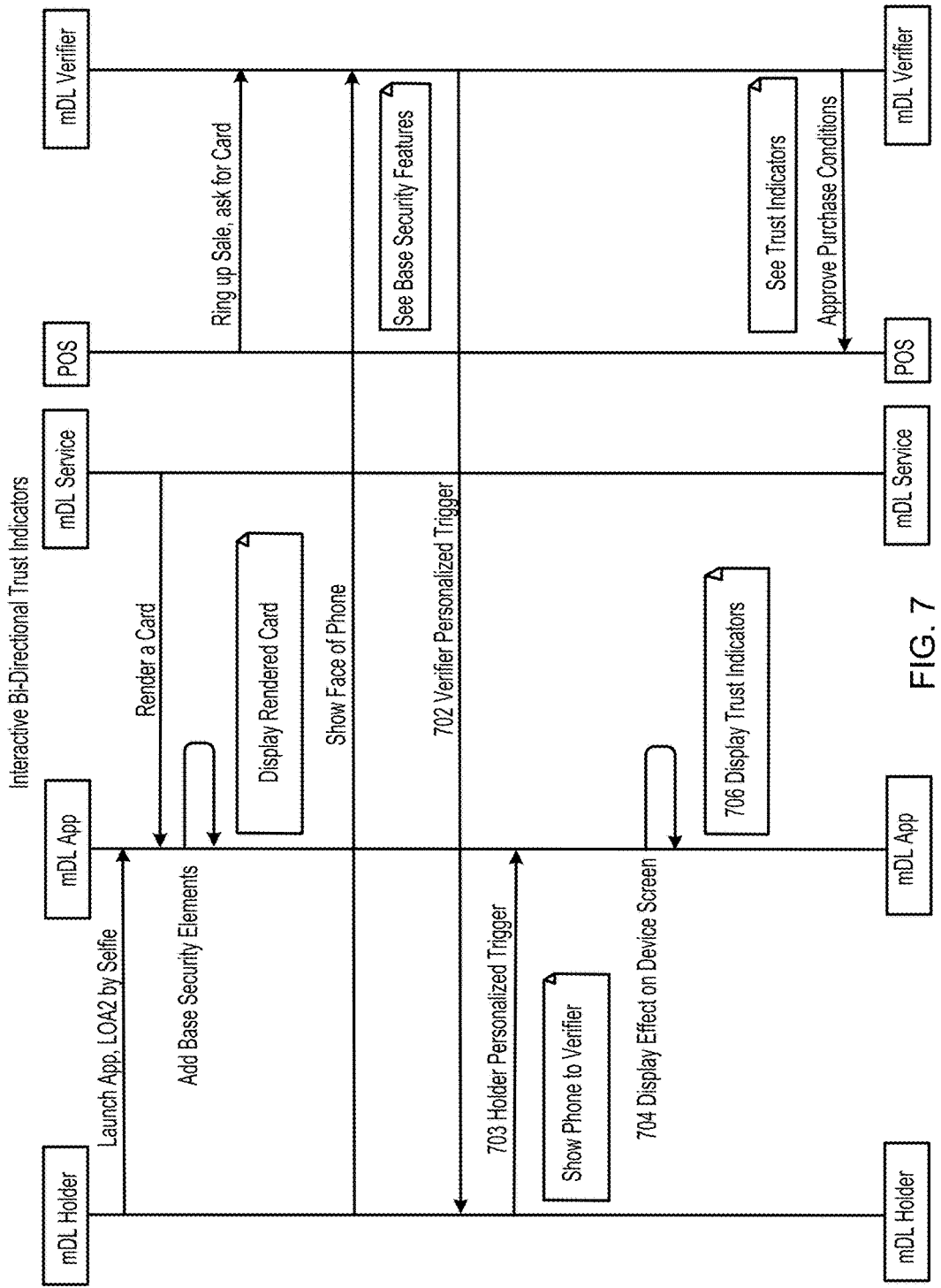
FIG. 7 illustrates a sequence diagram for an in-person interaction as in FIG. 6 with the difference being that the Holder performs a personalized trigger, known and set up in advance, that initiates the interactive effect and may be further qualified with a biometric or other user authentication action to perform an identity verification in front of the Verifier.

FIG. 7 illustrates a sequence diagram for an in-person interaction as in FIG. 6 with the difference being that the verifier performs, using one or more sensing features of device 130, a personalized trigger (702), known and set up in advance, to initiate an interactive effect (704) at a display of user device 130. In some implementations, after the verifier interacts with device 130 to perform the personalized trigger, the interactive effect is initiated in response to the holder providing a personalized trigger (703) to device 130, using at least one sensing feature of the device. The interactive effect can be further qualified with a biometric or other user/holder authentication action to perform an identity verification in front of the verifier. As described above, interactive effects can correspond to trust indicators that are displayed at user device 130 (706) in response to the device receiving the personalized trigger(s) (e.g., verifier and holder), such as a verbal request for personalized trigger action or a pre-determined mDL Verifier interaction with the device. The indicators 706 can be personalized for the Verifier and/or those of the Authority.

As noted above, a user/trigger input received by sensors or detection means of user device 130 can generate or activate interactive security features based on triggered effects that are viewable at a display of user device 130. Device 130 can receive a variety of input data using any sensors of device 130, wherein the input data includes a particular challenge (e.g., a challenge phrase or passcode) for authenticating a particular identity document. In some implementations, a holder of an mDL can have a personalized trigger for activating or executing an authentication feature or interactive security feature of an identity document. For example, a personalized trigger can correspond to a predefined touch pattern or predefined passphrase, such as a spoken utterance from user that is recognized by the device.

In some implementations, the Verifier may have a personalized trigger and data associated with the Verifier's personalized trigger can be downloaded to the mDL device (e.g., device 130) at the time of (or based on) the device entering the geo-location area of the Verifier. For example, data associated with the Verifier's personalized trigger can correspond to a liquor store clerk's predetermined pattern (e.g., a sensor input pattern) that is downloaded at device 130 when the mDL device enters the geo-fenced location of the liquor store). User device 130 can be configured to detect or retrieve a particular nearby communications signal that is associated with a virtual geographic boundary (e.g., a geo-fence or a Bluetooth radius). The detected or retrieved signal can include data about a particular vendor or store location. In some implementations, the signal is a data signal that causes an application program for displaying a digital identification document to request authentication information from a holder of the mDL or digital ID document. In other implementations, the signal includes data parameters indicating verifier's personalized trigger and the application program is configured to detect the verifier's personalized trigger based on analysis of data parameters of the signal. Detection of the verifier's personalized trigger by an application program can function as an authentication measure of application programs that generate visual renderings of digital ID documents.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory program carrier for execution by, or to control the operation of, data processing apparatus. Alternatively, or in addition, the program instructions can be encoded on an artificially generated propagated signal, e.g., a machine-generated electrical, optical, or electromagnetic signal, which is generated to encode information for transmission to suitable receiver apparatus for execution by a data processing apparatus. The computer storage medium can be a machine-readable storage device, a machine-readable storage substrate, a random or serial access memory device, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array), an ASIC (application specific integrated circuit), or a GPGPU (General purpose graphics processing unit).

Computers suitable for the execution of a computer program include, by way of example, can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball or touch-screen, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending messages or documents to and receiving messages or documents from a device that is used by any user; for example, by sending web pages to a web browser on a user's client device in response to requests received from the web browser.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    generating a digital identification that includes a digital authority indicator, a digital image of a person, and an attribute of the person rendered on a display of a computing device presented by the person to indicate an identity of the person;
    detecting, using a sensor of the computing device, touch input at the display of the computing device based on physical contact by a user with a first section of the display;

triggering, by the computing device, an interactive effect of the digital identification in response to detecting the touch input at the display of the computing device; and
using the interactive effect triggered in response to detecting the touch input at the display to:
  i) validate the identity of the person that presented the digital identification and
  ii) verify authenticity of the digital authority indicator based on a characteristic of the interactive effect that exaggerates a feature of the digital identification at a second section of the display without the user physically contacting the second section of the display.

2. The method of claim 1, comprising, in response to triggering the interactive effect, providing, by the computing device, a trust indicator associated with data displayed as part of the digital identification.

3. The method of claim 2, wherein the trust indicator is provided, at least in part, by an authority associated with the digital authority indicator, and the method comprises:
  providing a freshness indicator that includes a date and a time of an update that validates a freshness of the freshness indicator, wherein the authority indicator and the freshness indicator provide an indication of accuracy of data within the digital identification that describes the identity of the person.

4. The method of claim 3, wherein the authority indicator and the freshness indicator are each adjustable based on a pre-determined adjustment schedule to indicate that the digital identification was issued from an official source and includes information that was validated within a particular time period.

5. The method of claim 2, wherein the trust indicator represents a verifier-specific icon that is displayed, at the computing device, as part of the digital identification to indicate that the digital identification is located within a virtual boundary of a pre-determined verifier region.

6. The method of claim 5, wherein:
  the verifier specific icon is displayed as part of the digital identification and the digital authority indicator corresponds to an entity that issued the digital identification, and
  each of the digital authority indicator and the verifier-specific icon are displayed as an overlay to the digital identification when the digital identification is rendered for authentication within the virtual boundary of the predetermined verifier region.

7. The method of claim 1, wherein:
  triggering the interactive effect includes altering an appearance of the digital identification,
  the display is a touch-screen display,
  detecting the touch input includes detecting that a user tapped the display of the computing device, and
  the interactive effect tracks to a location of the tap to indicate liveliness of the digital identification.

8. The method of claim 7, wherein the characteristic of the interactive effect includes at least one of a digital bubble effect, a digital ripple effect, a dimensional extrusion effect, a digital holographic effect, a digital polasecure effect, or a digital face rotation effect.

9. The method of claim 1, further comprising, sensing, by at least one sensor of the computing device, a user input to the computing device, wherein the user input causes an authentication feature associated with the digital identification to be viewable at the display.

10. The method of claim 9, wherein the at least one sensor includes an image acquisition sensor, an audio input sensor, a touch input sensor, a gesture recognition sensor, a positioning or acceleration sensor, a wireless communication detection sensor, or a location sensor, and wherein one or more of the sensors are configured to recognize a particular user input corresponding to a specific or personalized trigger.

11. The method of claim 9, wherein the user input is for a personalized trigger of a verifier, and wherein the personalized trigger of the verifier is loaded at the computing device based on the computing device being located within a particular geo-location.

12. The method of claim 11, wherein data representing the user input is communicated, via secure nearby communication, to the computing device by a device of the verifier, and wherein receipt, by the computing device, of the data representing the user input indicates that the computing device is configured to display a digital rendering of a mobile driver's license (mDL) corresponding to the digital identification.

13. The method of either claim 11, wherein a personalized trigger of the verifier is configured to challenge an application program of the computing device that generates a digital rendering of an mDL to authenticate a user of the mDL as the proper and intended owner of the mDL based on multi-factor authentication or a personalized trigger of the user of the mDL.

14. The method of claim 1, wherein the digital authority indicator represents an official seal that indicates a state, a jurisdiction, an entity, or an agency that authorized creation of the digital identification.

15. The method of claim 14, further comprising:
  regenerating the digital authority indicator for rendering on the display of the computing device based on at least one of: a predetermined schedule or the relative location of the computing device, wherein the computing device is configured to display the digital authority indicator and an indicator of a verifier entity.

16. An electronic system, comprising:
  one or more processing devices;
  one or more non-transitory machine-readable storage devices storing instructions that are executable by the one or more processing devices to cause performance of operations comprising:
  generating a digital identification that includes a digital authority indicator, a digital image of a person, and an attribute of the person rendered on a display of a computing device presented by the person to indicate an identity of the person;
  detecting, using a sensor of the computing device, touch input at the display of the computing device based on physical contact by a user with a first section of the display;
  triggering, by the computing device, an interactive effect of the digital identification in response to detecting the touch input at the display of the computing device; and
  using the interactive effect triggered in response to detecting the touch input at the display to:
    i) validate the identity of the person that presented the digital identification and
    ii) verify authenticity of the digital authority indicator based on a characteristic of the interactive effect that exaggerates a feature of the digital identification at a second section of the display without the user physically contacting the second section of the display.

17. The electronic system of claim 16, wherein the operations further comprise, in response to triggering the interactive effect, providing, by the computing device, a trust indicator associated with data displayed as part of the digital identification.

18. The electronic system of claim 17, wherein the trust indicator is provided, at least in part, by an authority associated with the digital authority indicator, and the operations comprise;
  providing a freshness indicator that includes a date and a time of an update that validate a freshness of the freshness indicator, wherein the authority indicator and the freshness indicator provide an indication of accuracy of data within the digital identification that describes the identity of the person.

19. The electronic system of claim 18, wherein the authority indicator and the freshness indicator are each adjustable based on a pre-determined adjustment schedule to indicate that the digital identification was issued from an official source and includes information that was validated within a particular time period.

20. The electronic system of claim 17, wherein the trust indicator represents a verifier-specific icon that is displayed, at the computing device, as part of the digital identification to indicate that the digital identification is located within a virtual boundary of a pre-determined verifier region.

21. The electronic system of claim 20, wherein:
  the verifier specific icon is displayed as part of the digital identification and the digital authority indicator corresponds to an entity that issued the digital identification, and
  each of the digital authority indicator and the verifier-specific icon are displayed as an overlay to the digital identification when the digital identification is rendered for authentication within the virtual boundary of the predetermined verifier region.

22. The electronic system of claim 16, wherein;
  the verifier specific icon is displayed as part of the digital identification and the digital authority indicator corresponds to an entity that issued the digital identification, and
  each of the authority indicator and the verifier-specific icon are displayed as an overlay to the digital identification when the digital identification is rendered for authentication within the virtual boundary of the pre-determined verifier region.

23. The electronic system of claim 22, wherein the characteristic of the interactive effect includes at least one of a digital bubble effect, a digital ripple effect, a dimensional extrusion effect, a digital holographic effect, a digital polasecure effect, or a digital face rotation effect.

24. The electronic system of claim 16, further comprising, sensing, by at least one sensor of the computing device, a user input to the computing device, wherein the user input causes an authentication feature associated with the digital identification to be viewable at the display.

25. The electronic system of claim 24, wherein the at least one sensor includes an image acquisition sensor, an audio input sensor, a touch input sensor, a gesture recognition sensor, a positioning or acceleration sensor, a wireless communication detection sensor, or a location sensor, and wherein one or more of the sensors are configured to recognize a particular user input corresponding to a specific or personalized trigger.

26. The electronic system of claim 24, wherein the user input is for a personalized trigger of a verifier, and wherein the personalized trigger of the verifier is loaded at the computing device based on the computing device being located within a particular geo-location.

27. The electronic system of claim 26, wherein data representing the user input is communicated, via secure nearby communication, to the computing device by a device of the verifier, and wherein receipt, by the computing device, of the data representing the user input indicates that the computing device is configured to display a digital rendering of a mobile driver's license (mDL) corresponding to the digital identification.

28. The electronic system of either claim 26, wherein a personalized trigger of the verifier is configured to challenge an application program of the computing device that generates a digital rendering of an mDL to authenticate a user of the mDL as the proper and intended owner of the mDL based on multi-factor authentication or a personalized trigger of the user of the mDL.

29. The electronic system of claim 16, wherein the digital authority indicator represents an official seal that indicates a state, a jurisdiction, an entity, or an agency that authorized creation of the digital identification.

30. A non-transitory computer storage device encoded with a computer program, the program comprising instructions that, when executed by one or more processing units, cause performance of operations comprising:
  generating a digital identification that includes a digital authority indicator, a digital image of a person, and attribute of the person rendered on a display of a computing device presented by the person to indicate an identity of the person;
  detecting, using a sensor of the computing device, touch input at the display of the computing device based on physical contact by a user with a first section of the display;
  triggering, by the computing device, an interactive effect of the digital identification in response to detecting the touch input at the display of the computing device; and
  using the interactive effect triggered in response to detecting the touch input at the display to:
   i) validate the identity of the person that presented the digital identification and
   ii) verify authenticity of the digital authority indicator based on a characteristic of the interactive effect that exaggerates a feature of the digital identification at a second section of the display without the user physically contacting the second section of the display.

* * * * *